United States Patent [19]

Russ, Sr.

[11] 3,711,165
[45] Jan. 16, 1973

[54] DRIVE SYSTEM FOR A FLEXIBLE TRACK

[75] Inventor: Paul E. Russ, Sr., Englewood, Colo.

[73] Assignee: The Gates Rubber Company, Denver, Colo.

[22] Filed: May 11, 1970

[21] Appl. No.: 36,198

[52] U.S. Cl. ............................................ 305/35 EB
[51] Int. Cl. ........................................... B62d 55/24
[58] Field of Search ...... 305/35 R, 35 EB, 37, 38, 57; 74/231 C

[56] References Cited

UNITED STATES PATENTS

| | | | |
|---|---|---|---|
| 2,998,998 | 9/1961 | Hyler | 305/10 X |
| 3,072,443 | 1/1963 | Yoe | 305/37 |
| 1,774,797 | 9/1930 | Knox | 305/54 |
| 3,575,474 | 4/1971 | Russ | 305/35 EB |
| 2,461,150 | 2/1949 | Flynn | 305/35 EB |
| 3,472,563 | 10/1969 | Irgens | 305/35 EB X |
| 1,542,625 | 6/1925 | MacGown | 180/5 A |
| 2,290,109 | 7/1942 | Mayne | 305/38 |

FOREIGN PATENTS OR APPLICATIONS

| | | | |
|---|---|---|---|
| 801,119 | 12/1950 | Germany | 305/38 |
| 466,116 | 10/1928 | Germany | 305/35 EB |
| 561,191 | 8/1958 | Canada | 305/35 EB |
| 1,006,365 | 1/1952 | France | 305/38 |

Primary Examiner—Richard J. Johnson
Attorney—Raymond Fink and H. W. Oberg, Jr.

[57] ABSTRACT

A misalignment compensating system including a flexible track having lugs projecting from its inner surface in a spaced-apart relationship, and a drive wheel having projecting tangs that engage the lugs to propel the track.

19 Claims, 7 Drawing Figures

PATENTED JAN 16 1973 3,711,165

INVENTOR.
PAUL E. RUSS SR.
BY H. H. Oberg Jr
ATTORNEY

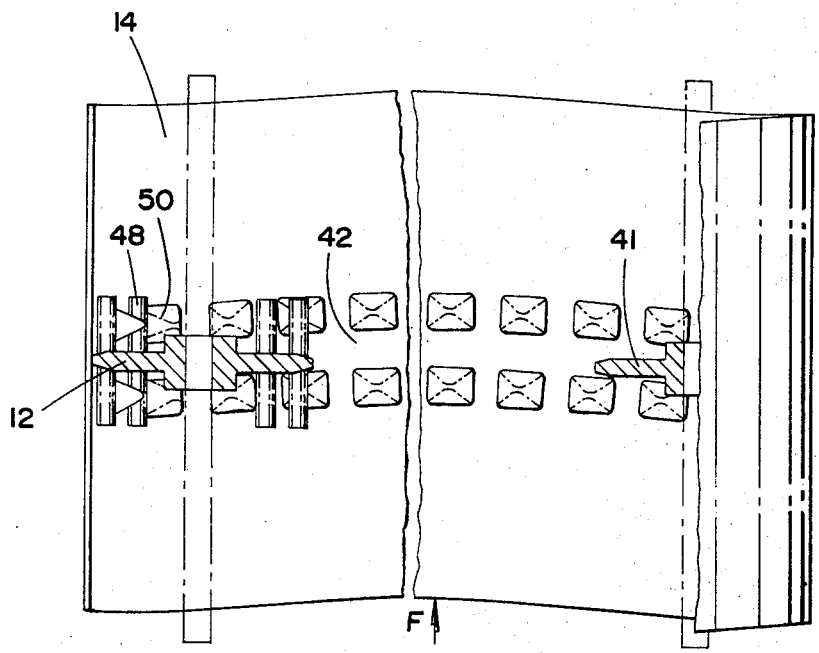
FIG. 3
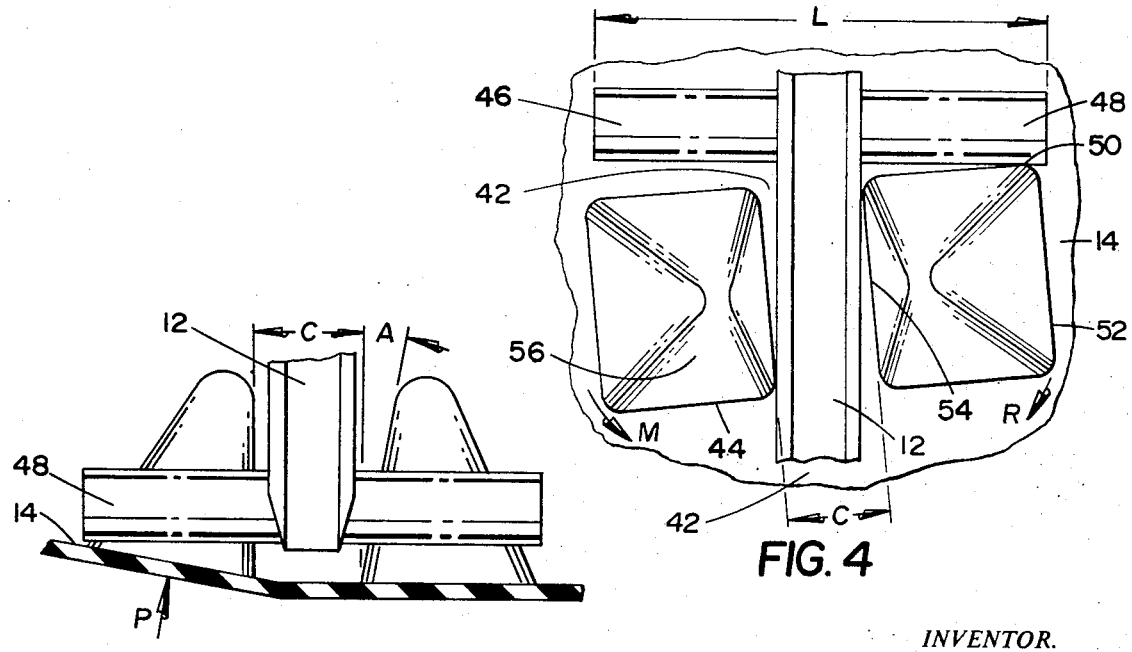
FIG. 4
FIG. 5
INVENTOR.
PAUL E. RUSS SR.
BY H. H. Oberg Jr
ATTORNEY

INVENTOR.
PAUL E. RUSS SR.

DRIVE SYSTEM FOR A FLEXIBLE TRACK

BACKGROUND OF THE INVENTION

This invention relates to wheel substitutes for land vehicles, but more particularly, this invention relates to track construction and to endless track driving systems that compensate for misalignment.

One principle object of this invention is to provide an improved track construction that includes improved misalignment compensating features.

It is another object of the invention to provide a driving system arrangement that includes misalignment compensating features.

Yet another object of this invention is to provide a drive system arrangement which will not be adversely affected by snow, mud, slush or debris.

Another object of this invention is to provide a smooth operating drive system capable of being propelled at high horsepower levels while still retaining misalignment compensating features.

SUMMARY OF THE INVENTION

In accordance with the invention there is provided a flexible track including at least one pair of laterally spaced rows of spaced-apart driving lugs which have a special shape that permits the track to be propelled when misalignment is externally induced into the drive system.

Also, in accordance with the invention, there is provided a drive wheel disposed to sequentially engage each successive pair of drive lugs. The physical relationship between engaged lugs and the drive wheel is so arranged that externally induced misalignment angles between the track and drive wheel may be tolerated. The drive wheel comprises a rotatable wheel from which projects on each side a plurality of circumferentially-spaced tangs.

Other objects, advantages and features of the invention will become apparent upon review of the drawings and description thereof, wherein:

FIG. 3 is a view similar to that of FIG. 2 but showing the track distorted or misaligned with respect to the drive wheel.

FIG. 4 is an enlarged view of FIG. 3.

FIG. 5 is an enlarged end view showing a distorted track.

TECHNICAL DISCLOSURE

Figure 1:
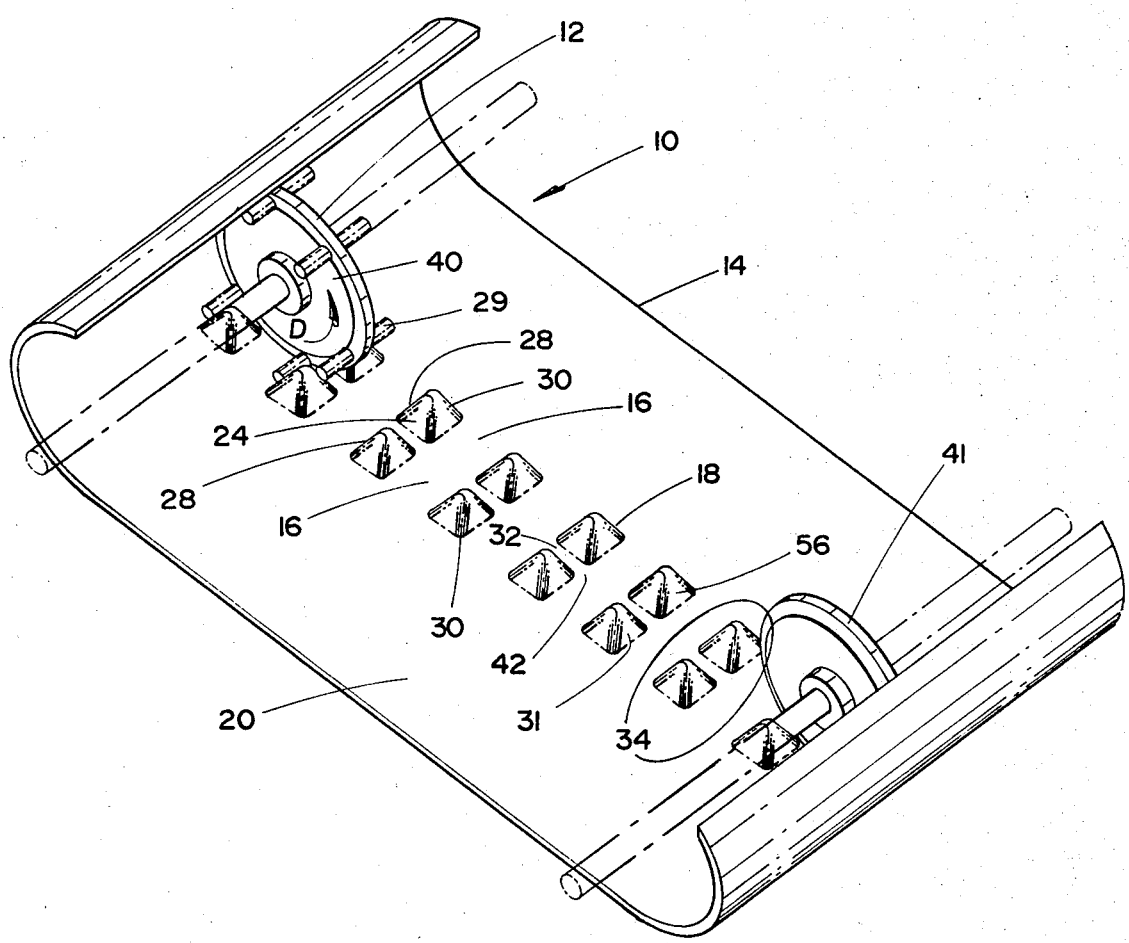
FIG. 1 is a fragmentary isometric view of a drive system incorporating features of the invention.
Figure 2:
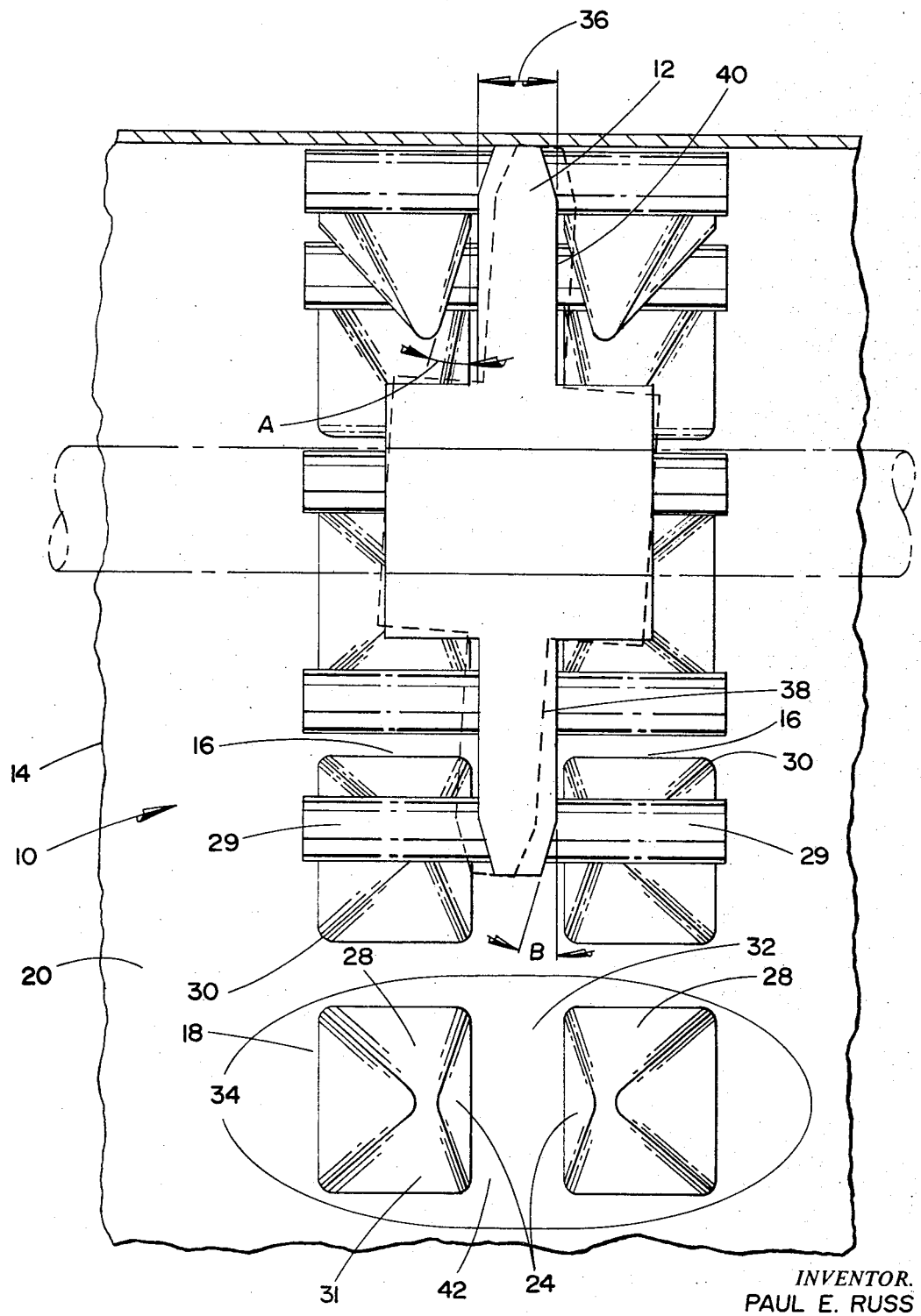
FIG. 2 is a fragmentary plan view of FIG. 1 showing the inner surface of the track and normal engagement of the track with the drive wheel.

Referring now to the drawings but more particularly to FIGS. 1 and 2, the drive system of the invention is broadly identified by the numeral 10. The drive system includes as the predominant elements a drive wheel 12 and a track 14 having at least one pair of rows 16 of specially shaped and positioned lugs 18.

The track 14 may be constructed using typical elastomeric article forming techniques such as rubber fabrication (e.g. attachment of elements to rubber belting material), rubber molding or plastic casting. The lugs 18 are formed on the inner surface 20 of the track body during the construction process. Each lug 18 is specially shaped and positioned on the track to tolerate externally induced misalignment between the track 14 and drive wheel 12 which will be later explained. Each lug has a surface 24 juxtaposed to each side of the drive wheel 12. The surface 24 may be flat or rounded and inclined at an angle A of between 0° and 25°. Preferably, the juxtaposed surface 24 has an inclination angle of 17°. Also, the driving surface 28 of the lug 18 is inclined to receive and mesh with tangs 29 as the drive wheel is rotated. It is preferred that the remaining surfaces also be inclined and that the corners 30 of the lugs be rounded which results in a lug having a somewhat rounded pyramidal shape. A misalignment compensating drive system operable during reverse and braking of the drive wheel is effected by inclining the rear surface 31 of the lugs and rounding the corners. Lateral spacing 32 between a pair of lugs 34 is greater than the width 36 of the drive wheel 12 and thus the drive wheel of this embodiment is not required to be in side contact with the lug as a V-belt would be in contact with a sheave or as the drive arrangement of prior systems. Consequently, the drive wheel 12 may be rotated or twisted 38 in the space 32 between a pair of lugs without binding and, thus, the drive wheel may be misaligned with respect to the track.

The drive wheel 12 comprises a disc-shaped body 40 from which projects a plurality of tangs 29. The pitch or spacing between successive tangs is such to allow meshing with the successive lugs of a row 16. The circumferential edge of the wheel is beveled on each side at an angle B of between 0° and 25° but the difference between the inclination angle A of the juxtaposed surfaces 24 and the bevel angle B of the drive wheel 12 should be no more than ± 18° to prevent the drive wheel from climbing the lug. Preferably, the bevel angle B is larger than the inclination angle A by 5°. The drive wheel 12 is mounted to a shaft, shown in phantom, which receives rotational power from a source such as a motor or a powered transmission of a snowmobile or all-terrain type vehicle.

The track 14 is trained over the drive wheel 12 and at least one idler wheel 41 or slide, not shown. The drive wheel and preferably the idler wheel 41 are positioned to rotate in a runway 42 defined by the parallel and longitudinal rows 16 of lugs. Additional suspension wheels or systems, not shown, may be strategically positioned along the inner surface of the track to provide additional support. When the drive wheel 12 is rotated, the tangs 29 engage each successive pair 34 of lugs at the drive surface 28 thus propelling the track in a rotational manner and inducing the idler wheel 41 to rotate.

The drive system 10 of FIGS. 1 and 2 relates to a system where built-in misalignment compensating characteristics are present and where no misalignment has been externally induced. Referring now to FIGS. 3 and 4, a track 14 with externally induced misalignment is depicted. The track, being flexible and partially of an elastomeric material, is subject to repeated acts of misalignment while in use even though lateral stiffening members may be strategically located in or on the track to increase its lateral stiffness. Misalignment may be externally induced, for example, if the track were used on a snowmobile that was traversed across a steep hill, or where two parallel tracks are used on an all-terrain type vehicle negotiating a sharp turn. Such misalignment may be represented as being induced by a lateral force F which deflects the track and introduces an unbalancing misalignment moment M into the track. The misalignment moment causes the lug 44 to move away from the tang 46. A relative rotational or twisting motion of the track with respect to the drive wheel is allowed by providing a sufficient spacing C between a pair of lugs. The driving tang 48 engages the rounded corner 50 of the lug 52 and continues to propel the track. Driving on the lug corner 50 induces a small realignment moment R into the track which tends to counteract the misalignment moment M. The cumulative length L of a pair of tangs is sufficient to insure engagement of one of a pair of lugs when the track is misaligned. It should be noted that the drive wheel 12 is free to roll in the runway 42 without interference with the inclined surface 54 even though the track 14 has been twisted or rotated with respect to the drive wheel. In conventional driving systems where a relative rotating or twisting movement is not available, the drive wheel rides the adjacent lug surface, similar to surface 54, causing the drive wheel to ride high on the lug. If too much misalignment is induced into a conventional system, the drive wheel will climb the lug thereby causing the drive system to slip or ratchet.

Another type of misalignment that may be encountered is illustrated by FIG. 5. When a track 14 is propelled over rough terrain, the uneven terrain surface may exert localized forces P causing a wave motion in the track and thereby induce misalignment as illustrated in FIG. 4 or may induce a localized deflection as illustrated in FIG. 5. By providing a sufficient spacing C, the lugs are precluded from binding against the drive wheel 12 as the track is deflected.

The foregoing discussion of misalignment compensating by the drive system was in reference to the track being propelled in a forward manner as indicated by the directional arrow D, FIG. 1. By inclining the rear lug surface 56 and rounding the rear outside corners in a manner similar to the front surfaces 28, the drive system 10 retains its misalignment compensating features when the track is propelled in reverse or when the drive wheel is deaccelerated such as occurs during braking. The operation of the misalignment compensating drive system in reverse is similar to that previously explained for the forward drive system.

The misalignment compensating features were explained in relationship to the track and a drive wheel having tangs. The misalignment compensating features are also prevalent between a track and any idler or boggie-type wheel positioned to run in the path defined by two rows of lugs. As may be readily understood in reference to FIG. 3, an idler wheel 41 rotates in the runway 42 of adequate width which permits the track to be twisted or rotated relative to the wheel. The rounded corners and surfaces of the pyramidal shaped lugs provide surfaces over which a boggie wheel may react to maintain the track in alignment.

The drive system as depicted in FIGS. 1 through 6 also includes anti-fouling characteristics which render a drive arrangement that is not adversely affected by snow, mud, slush or debris. The spacing between a pair of lug rows 16 provides sufficient clearance between the drive wheel 12, idler wheel 41, or boggie wheel 58 for the dissipation of debris away from said wheels to alleviate fouling.

Additional Species

Figure 6:
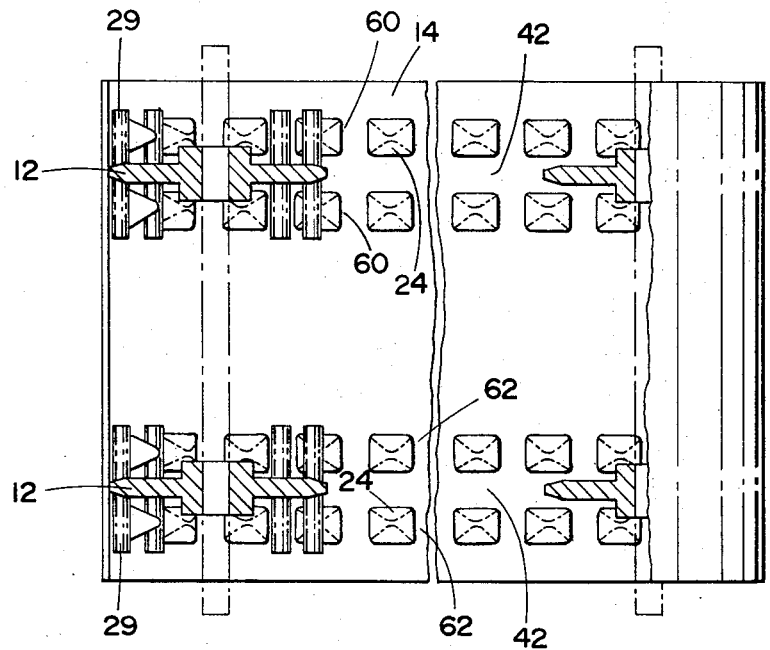
FIG. 6 is a plan view showing the inner surface of an alternate track construction.

With the advent of high power snowmobiles and all-terrain vehicles, a drive system having greater power capacity is needed. Drive systems of high power capability with misalignment compensating features may be constructed by including two or more pairs of lug rows 60 and 62 to the track 14 as depicted by FIG. 6. The drive system of FIG. 6 is similar in operation and performance to that as previously explained for FIGS. 1 through 5.

Figure 7:
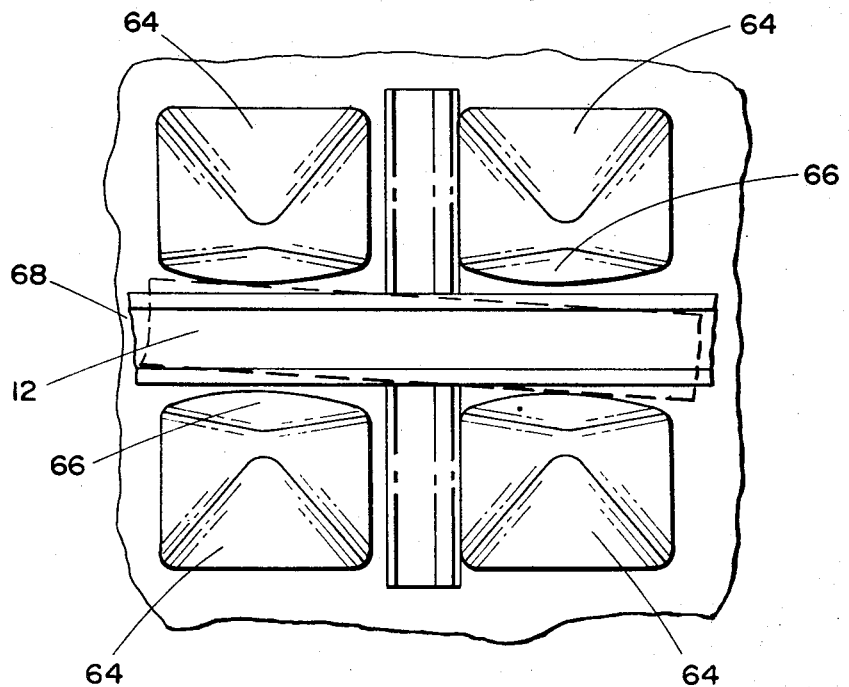
FIG. 7 is an enlarged partial plan view showing the inner surface of an alternate track construction.

Still another embodiment of this invention is shown in FIG. 7. The shape of the lugs 64 has been slightly modified from that of FIGS. 1 through 5. The lugs 64 have been rounded or convexed slightly on the juxtaposed surface 66 to the drive wheel 12 and the runway 68, is narrower. However, the rounded surface 66 allows the track to be rotated or twisted in the runway 68 without interference. The operation of this misalignment compensating drive system is similar to that as previously explained for FIGS. 1 through 5.

What is claimed is:

1. An integrally molded endless track of the misalignment compensating type for use with laterally spaced drive wheels having a plurality of axially aligned and circumferentially spaced tangs protruding from each side of the drive wheel, said track comprising:
    a substantially flat body of the elastomeric construction type, said body having a generally flat inner surface; and
    at least two pairs of rows of integrally molded pyramidal lugs protruding from and longitudinally arranged on the inner surface of said body, said lugs having tapering front and rear surfaces meshable with the tangs of the drive wheels, and said lugs of each pair of rows meshable with the tangs of one of the drive wheels and said lugs of each of the rows laterally aligned with the lugs of each of the other rows, the longitudinal spacing between lugs being greater than the longitudinal base thickness of the lugs, and the lateral spacing between the lugs of each pair of rows being substantially less than the spacing between each pair of rows whereby said body may be laterally twisted and rotated in relation to the drive wheels.

2. An endless track according to claim 1 wherein said pyramidal shaped lugs have rounded corners.

3. An endless track according to claim 1 wherein said pyramidal shaped lugs have rounded surfaces and corners.

4. A misalignment compensating drive system comprising;
    at least one drive wheel including a plurality of axially aligned and circumferentially spaced apart tangs protruding from each side of a wheel, the tangs of one side being in lineal alignment with the tangs of the other side;
    a substantially flat and endless track having an inner surface, said track trained over said drive wheel; and at least one pair of parallel rows of spaced-apart, pyramidal shaped lugs protruding from and longitudinally arranged on the inner surface of said track, said lugs meshable with said tangs, and said lugs of a row laterally aligned with said lugs of the paired row, the longitudinal spacing between successive lugs being substantially greater than the size of the tangs, and the lateral spacing between the lug rows being substantially greater than the width of the wheel whereby said track may be laterally twisted and rotated in relation to said drive wheel.

5. A misalignment compensating drive system according to claim 4 wherein said pyramidal shaped lugs have rounded corners.

6. The misalignment compensating drive system according to claim 4 wherein said pyramidal shaped lugs have rounded surfaces and corners.

7. A misalignment compensating drive system according to claim 4 wherein said drive wheel is circumferentially beveled on each side.

8. A drive system as set forth in claim 4 wherein the pyramidal lugs are shaped substantially to a point.

9. A misalignment compensating drive system comprising:
at least one rotatable drive wheel including a plurality of axially aligned and circumferentially spaced apart tangs protruding from each side of a wheel, the tangs of one side in lineal alignment with the tangs of the opposite side;
a substantially flat and endless track having an inner surface;
at least one pair of spaced-apart but parallel rows of spaced-apart pyramidal shaped lugs protruding from and longitudinally aligned along the inner surface of said track, said lugs of a row laterally aligned with said lugs of the paired row and said lugs meshable with said tangs, the longitudinal spacing between successive lugs being substantially greater than the width of the wheel; and
a runway on the inner surface of said track, said runway disposed between and having a width defined by each pair of said rows, the width of said runway being substantially greater than the width of the wheel,
said track trained over said drive wheel at said runway whereby said tangs mesh successively with said lugs when said drive wheel is rotated and whereby said track may be laterally twisted and rotated with respect to said drive wheel without said lugs interfering with said drive wheel.

10. A misalignment compensating drive system according to claim 9 and further including a rotatable idler wheel, said track trained over said drive wheel and said idler wheel at said runway, whereby rotation of said drive wheel propels said track and induces rotation of said idler wheel.

11. A drive system as set forth in claim 9 wherein the pyramidal lugs are shaped substantially to a point.

12. A misalignment compensating drive system comprising:
at least one rotatable drive wheel including a plurality of axially aligned and circumferentially spaced-apart tangs protruding from each side of a wheel, the tangs of one side in lineal alignment with the tangs of the opposite side, and said tangs in lineal alignment defining a cumulative length;
a substantially flat and endless track having an inner surface;
at least one pair of spaced-apart but parallel rows of spaced-apart pyramidal shaped lugs having surfaces protruding from and longitudinally aligned along the inner surface of said track, said lugs of a row laterally aligned with said lugs of the paired row and said lugs meshable with said tangs, the longitudinal spacing between successive lugs being substantially greater than the width of the wheel; and
a runway on the inner surface of said track, said runway disposed between and having a width defined by each pair of said rows, the width of said runway being substantially greater than the width of the wheel,
said track trained over said drive wheel at said runway whereby said drive wheel is juxtaposed to said pair of lugs and said tangs mesh successively with said lugs when said drive wheel is rotated, and the cumulative length of said tangs is sufficient that engagement between said lugs and said tangs is made when said wheel is adjacent either row of lugs, and whereby said track may be laterally twisted and rotated with respect to said drive wheel without said lugs interfering with said drive wheel.

13. A misalignment compensating drive system according to claim 12 and further including a rotatable idler wheel, said track trained over said drive wheel and said idler wheel at said runway, whereby rotation of said drive wheel propels said track and induces rotation of said idler wheel.

14. A misalignment compensating drive system according to claim 12 wherein said drive wheel is circumferentially beveled on each side at an angle between 0° and 25° but having a difference in angle of no more than 18° from the surface of juxtaposed lugs, and the juxtaposed surfaces of said lugs inclined at an angle no greater than 25°.

15. A drive system as set forth in claim 12 wherein the pyramidal lugs are shaped substantially to a point.

16. A misalignment compensating drive system comprising:
at least one rotatable drive wheel including a plurality of axially aligned and circumferentially spaced-apart tangs protruding from each side of a wheel, the tangs of one side in lineal alignment with the tangs of the opposite side;
a substantially flat and endless track having an inner surface;
at least one pair of spaced-apart but parallel rows of spaced-apart pyramidal shaped lugs having surfaces and protruding from and longitudinally aligned along the inner surface of said track, said lugs of a row juxtaposed and laterally aligned with said lugs of the paired row, said lugs having juxtaposed and facing convex surfaces, said lugs meshable with said tangs, the longitudinal spacing between successive lugs being substantially greater than the width of the wheel; and
a runway on the inner surface of said track, said runway disposed between and having a width defined by each pair of said rows, the width of said runway being substantially greater than the width of the wheel, said track trained over said drive wheel at said runway whereby said tangs mesh successively with said lugs when said drive wheel is rotated, and the width of said runway in combination with the convex surfaces of said juxtaposed lugs sufficient in dimension whereby said track may be twisted with respect to said drive wheel without said lugs interfering with said drive wheel.

17. A misalignment compensating drive system according to claim 16 and further including a rotatable idler wheel, said track trained over said drive wheel and said idler wheel at said runway, whereby rotation of said drive wheel propels said track and induces rotation of said idler wheel.

18. A misalignment compensating drive system according to claim 16 wherein said drive wheel is circumferentially beveled on each side at an angle between 0° and 25° but having a difference in angle of no more than 18° from the juxtaposed convex surfaces of said lugs and the juxtaposed surfaces being inclined at an angle no greater than 25°.

19. A drive system as set forth in claim 16 wherein the pyramidal lugs are shaped substantially to a point.

* * * * *